Nov. 29, 1960          E. GRETENER          2,962,544
METHOD OF PRODUCING A SUBTRACTIVE COLOR FILM COPY
Filed April 17, 1957          2 Sheets-Sheet 1
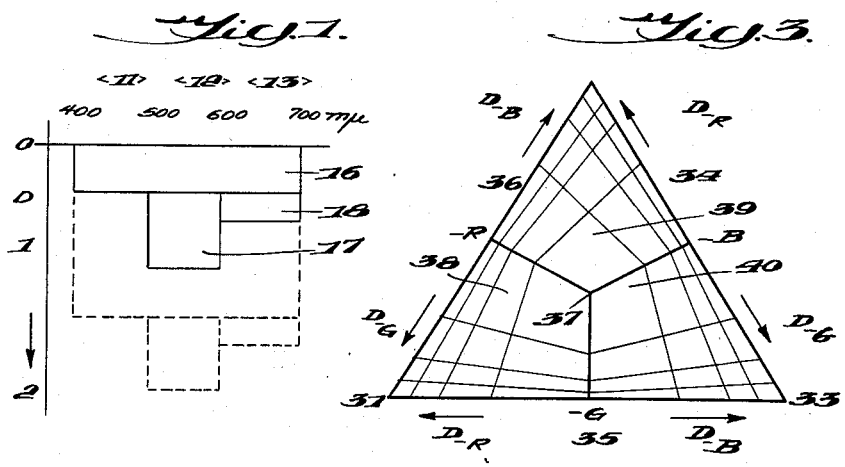
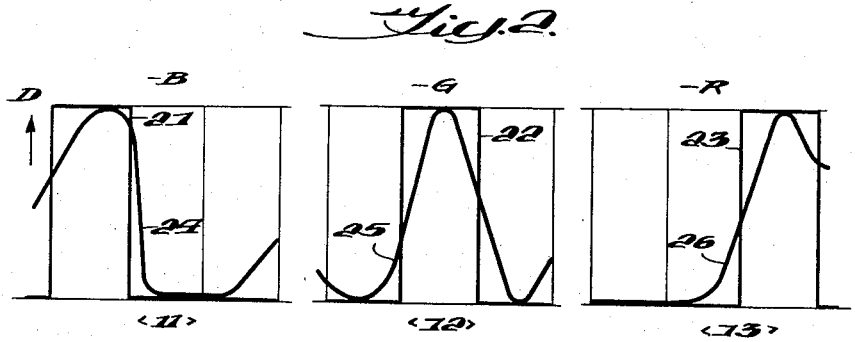
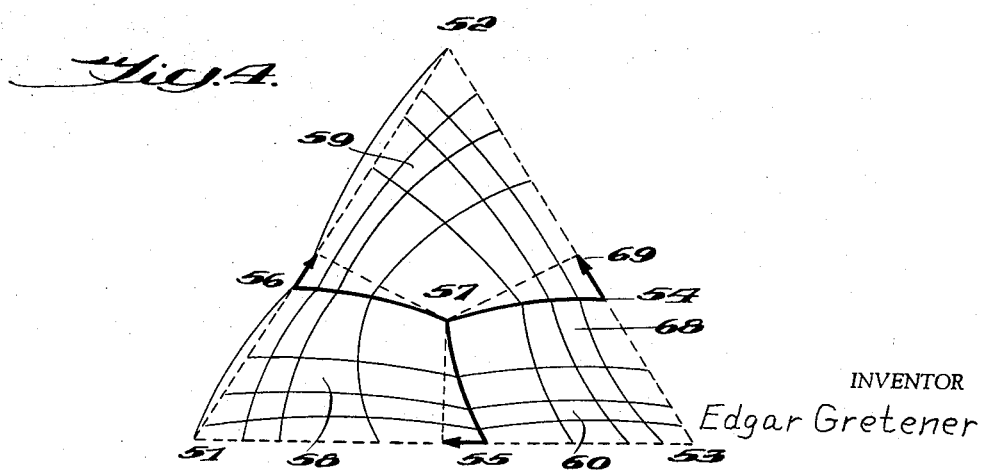
INVENTOR
Edgar Gretener
BY Pierce, Scheffler & Parker
ATTORNEYS Nov. 29, 1960 E. GRETENER 2,962,544
METHOD OF PRODUCING A SUBTRACTIVE COLOR FILM COPY
Filed April 17, 1957 2 Sheets-Sheet 2

INVENTOR
Edgar Gretener

BY Pierce, Scheffler & Parker
ATTORNEYS

2,962,544
METHOD OF PRODUCING A SUBTRACTIVE COLOR FILM COPY

Edgar Gretener, Zurich, Switzerland, assignor to Edgar Gretener A.G., Zurich, Switzerland Filed Apr. 17, 1957, Ser. No. 653,338

Claims priority, application Switzerland Apr. 16, 1956

5 Claims. (Cl. 178—5.2)

This invention relates to a method of producing a subtractive color film copy.

Subtractive color films have been disclosed in which a neutral-gray and three colored recordings are used in such manner that at each point of the picture the density of the neutral-gray recording is equal to the black-white density required for regulating the brilliance of the color, and the densities in the three colored recordings correspond in each case to the two color remainder densities required for the reproduction of the color at each point of the picture. Subtractive color films of this kind are described in my now abandoned patent applications Serial No. 528,709 and No. 537,492, filed August 16, 1955, and September 29, 1955, respectively. Such films are produced preferably by electrical-optical scanning of the copy to be copied, conversion of the resulting color component signals into the black-white density signals and color remainder density signals, and photographic recording thereof.

A color film of this kind has the advantage that the non-linear color errors occurring with the usual recording processes working only with three colored emulsions, that is to say color errors dependent upon the brilliance, are avoided. However, owing to the properties of the dyes available in practice, linear color errors still occur even with the above mentioned process, and render a further color correction desirable.

This invention relates to a further development of a method of producing the said subtractive color films, with the object of a further improvement in the color reproduction. The invention thus relates to a method of producing a subtractive color film copy, in which the black-white density required for regulating the brilliance of the colors and the color remainder densities required for the color reproduction at each point of the picture in each case are recorded, and according to the invention is characterized in that in the recording of at least one of the three color remainder densities not only the particular associated color remainder density recording but also at least one of the other two color remainder density recordings is influenced in such manner that the resulting density series of subtractive primary colors lies approximately on a straight line passing through the white point and the opposite corner point of the reproduction triangle.

The method according to the invention will now be described hereinafter with reference to one exemplified embodiment, while in the accompanying drawings:

Figure 1 serves to explain the recording process used.

Figure 2 shows the spectral characteristic of ideal dyes and the dyes actually available.

Figure 3 shows the reproduction triangle when ideal dyes are used, and

Figure 4 shows the reproduction triangle using dyes actually available.

Figure 5:
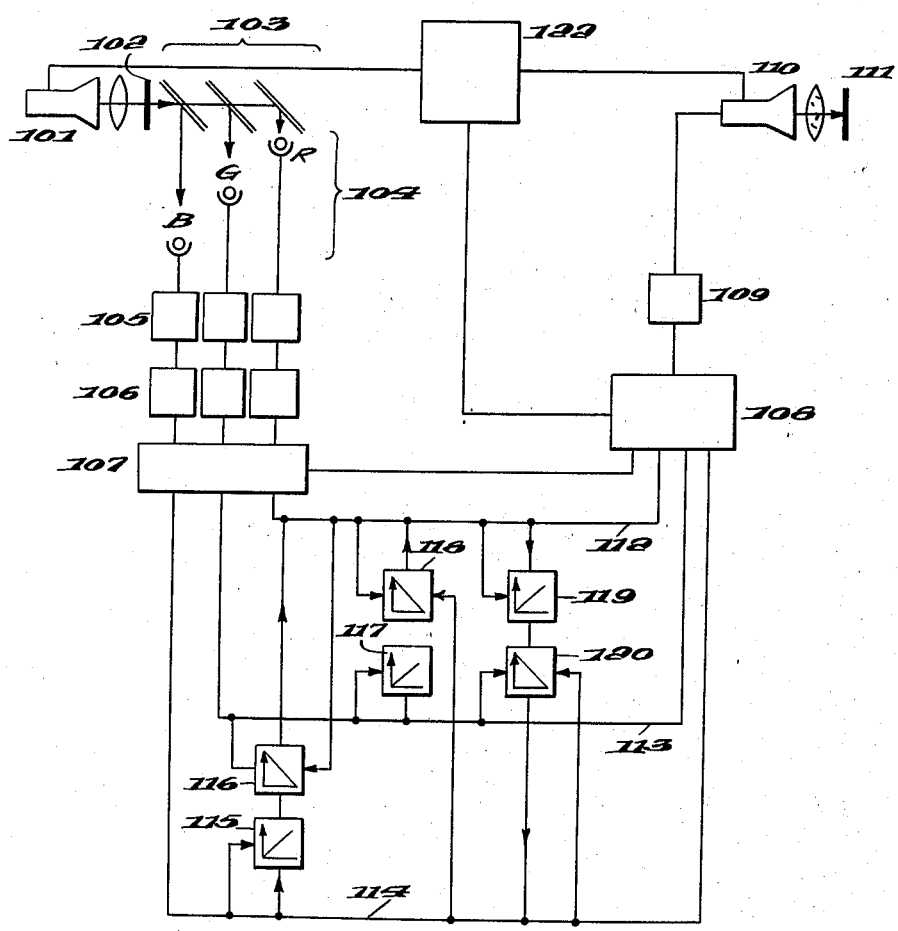
Figure 5 is a block circuit diagram of an apparatus for carrying out the method.

Figure 1 serves to explain the principle forming the basis of a color reproducing system of this kind. The region of visible light from 400 m$\mu$ to 700 m$\mu$ plotted as the x-axis is divided up into the three color component ranges 11, 12 and 13. The regions represented correspond approximately to the primary colors blue, green and red usually used today in color reproduction. From the x-axis downward are plotted the densities that have to be recorded in the individual color component regions for the reproduction of a determined color. As is well known, in subtractive processes the reproduction of color is effected by successively disposing in a white flow of light three colored emulsions or color recordings, each of which absorbs the fraction of the light associated with one of the color components and not required in the color reproduction. These three emulsions are generally designated "minus red" (—R), "minus green" (—G) and "minus blue" (—B) emulsion. Thus, for example, the minus red emulsion absorbs the surplus red spectral fraction of the light, and so on. The value of this absorption is usually indicated by the "density," which is equal to the logarithm of the reciprocal of the transparency.

In the case illustrated in Figure 1, the density in the blue region 11 amounts to 0.4 on the logarithmic density scale, in the green region 12 it is 1.0 and in the red region 13 0.6. Corresponding to these density values therefore are transparencies of 40%, 10% and 25%, or a color component ratio of 4:1:2.5.

It should further be pointed out that these densities relate to "color densities" which are referred only to the appertaining spectral region. Such color densities are measured with the use of special color filters matched to the particular spectral region.

In the present method, unlike former methods, these color densities are reproduced, not by three colored recordings, but by a neutral-grey and three colored recordings. At each point of the picture the density of the neutral-grey recording is equal in each case to the smallest of the three color densities of a conventional subtractive process. In contrast to the colored recordings, since it is neutral grey it absorbs uniformly or at least approximately uniformly over the entire spectral region. It thus effects regulation of the brilliance without a color action and is hereinafter referred to as "black-white density" for short. For the color reproduction there are now recorded in the three colored emulsions the densities resulting as the difference between the original densities, i.e. the color densities of a conventional subtractive system, and the black-white density. These are the densities required at each point for the color reproduction and are hereinafter referred to as "color remainder densities" for short. By definition, as will also be apparent from Figure 1, given exact performance of the method one of the three color remainder densities is always equal to zero, the method thus works with three colored recordings of which, given exact performance, at least one of the three colored recordings always has a zero density at each point of the picture. This is the recording that is associated with the smallest subtractive color density at each point of the picture. In Figure 1, according to the representation the black-white density 16 is shown with the density 0.4, while the minus green color remainder density 17 and the minus red color remainder density 18 differ from zero. There is no minus blue density.

The spectral density curves illustrated in Figure 1 relate to so-called ideal dyes. These have a rectangular spectral absorption characteristic which differs from zero only within the associated so-called "main region," and is furthermore constant. Outside the main region, in the so-called "subsidiary regions," the absorption is equal to zero. This is illustrated in Figure 2, which shows the density characteristic of the three ideal dyes 21, 22 and 23 whose main regions correspond to the color component regions 11, 12 and 13 illustrated in Figure 1. In contrast to these purely theoretical ideal dyes, which cannot be realized in practice, the dyes actually available have a spectral characteristic differing greatly from these ideal conditions, as shown approximately by the characteristics 24, 25 and 26 illustrated in Figure 2. The absorption is not constant over the main region and "parasitic absorption" occurring in the subsidiary regions is also variable, with a density variable in relation to the color reproduction in the main region. This results in a distortion of the reproduction triangle of a method working with real dyes in relation to the reproduction triangle of a method working with ideal dyes.

Reference is made to the color triangle shown in Figure 3, resulting from the use of ideal colors in the color reproduction process shown in Figure 1. The three corner points 31, 32 and 33 correspond to the reproduction colors blue (B), green (G) and red (R). In a system working with ideal dyes, they are represented by superimposition of two dyes at a time having an infinitely high density. In the recording of only one color at a time having an infinitely high density the points 34, 35 and 36 are obtained lying on the sides of the triangle and corresponding to the individual subtractive dyes, thus in the usual manner of expression the color points of "minus blue" (−B), "minus green" (−G) and "minus red" (−R). If the densities of the latter recordings are allowed to reduce to zero, the resulting color point shifts towards the white point 37 lying in the center of the triangle. These lines corresponding to the density series of the three subtratcive dyes divide the triangle into three sectors 38, 39 and 40, one of the three color remainder densities in each sector always being equal to zero. Thus in the sector 38 the (−B) associated color remainder density $D_{-B}$ is equal to zero, in the sector 39 the (−G) associated color remainder density $D_{-G}$ and in the sector 40 the (−R) associated color remainder density $D_{-R}$. In the sector 38 the color reproduction is thus effected only by the two color remainder densities $D_{-G}$ and $D_{-R}$, in the sector 39 only by the color remainder densities $D_{-B}$ and $D_{-R}$, and in the sector 40 by the color remainder densities $D_{-B}$ and $D_{-G}$. It is thus possible to plot in the color triangle in Figure 3 a network of lines of equal color remainder densities, from which the two color remainder densities required for the reproduction of each color point are obtained. The color remainder density at the same time increases in each case from the white point towards the sides of the triangle. Thus for example the (−G) associated color remainder density $D_{-G}$ is equal to zero along the line 34—37—36 and it rises towards infinity towards the triangle sides 31—33. As an example, in Figure 3 the lines (straight lines) of equal density, corresponding to the densities 0.5, 1.0 and 2.0, for the three color remainder densities are shown.

When non-ideal colors are used, the shape of the color triangle is distorted, as will be seen from Figure 4. The individual density lines are no longer straight lines, but are curved to a lesser or greater extent. The extent of this bending depends particularly on the magnitude and the trace of the parasitic absorptions. This distortion can be recognized particularly sharply from the previously mentioned density series of the subtractive dyes, which lie between the white point 57 and the points 54, 55, and 56 lying on the triangle sides. Conditions are generally most favorable at (−B), i.e. yellow dye, since as a rule this has slight parasitic absorptions and a steep transition from the subsidiary region into the main region (cf. Figure 2). Conditions are most unfavorable at (−R), i.e. blue-green dye, with which there is usually a very great displacement of the density series towards blue, that is to say with which the parasitic absorptions in the (−G) zone 12 play a disturbing part. With (−G), i.e. purple dye, which can have a main zone lying symmetrically to the subsidiary zones, it is conceivable for the parasitic absorptions likewise to be symmetrically distributed, in which case the line between the points 55 and 57 is straight. Even in this most favorable case however, the straight line between the color point on the triangle side corresponding to the subtractive color and the white point does not run in such a manner that its extension does not pass through the opposite corner point of the reproduction triangle. The density series and the opposite color point are therefore not complementary. In colorimetry, however, complementary means that two colors complementary to one another together form white. As is clear from Figure 3, this is the case with a system working with ideal colors, and must also be fulfilled in a practical color reproducing system if fundamental color errors and color distortions are to be avoided.

This drawback of hitherto proposed color reproducing systems, such as were mentioned in the introduction is now to be obviated by the present invention. This is achieved by the fact that in the recording of a color component not only the particular appertaining color remainder density recordings, but also at least one of the other two color remainder density recordings, is influenced in such manner that the resulting density series of the color remainder density recording in question in the reproduction triangle lies approximately on a straight line passing through the white point and the opposite corner point of the reproduction triangle. Correction of the color triangle is thus effected in the sense of complying with the above mentioned complementary condition.

Thus for example in the recording of the (−B) color remainder density, to which the uncorrected density series 68 corresponds, the (−R) color density recording will also be influenced, that is to say a certain density will also be recorded here. The color point of the resulting total density is thereby shifted in the direction of the arrow 69. The recording of the subsidiary density is now effected in a ratio such that the resulting color point fulfills the complementary condition.

According to the method, this is achieved by the fact that in the process working, as already mentioned above, with electrical-optical scanning and corresponding conversion of the signals obtained into black-white and color remainder density signals, the density signal serving to record a determined color remainder density is supplied in a determined ratio also to at least one of the other two color remainder density channels, so that a certain density is recorded not only in the associated color remainder density recording but also in one of the other two color remainder recordings.

In the distortion of the color remainder density network illustrated in Figure 4, the (−B) density series must be shifted towards green, thus with (−B) a certain (−R) density must also be recorded for correction to the complementary condition, that is to say a certain addition of the (−B) signal in the (−R) channel must be carried out. In the recording of the (−G) density series, a shift must be made towards blue, thus an addition of the (−G) signal to the (−R) channel must be made. In the recording of (−R), a shift must be made towards green. Thus in this case there must be an addition of the (−R) signal to the (−B) channel. It will be understood that this always applies in each case only for the color remainder density network distortion dependent upon the particular shape of the spectral absorption characteristics of the dyes used. When use is made of dyes other than those represented and with a corresponding density network, an appropriately different plan is is obtained for the additions.

By these correction steps it is thus possible to adapt the density series of the subtractive colors to the trace of the ideal colors, as is required for correct color reproduction, and the above mentioned complementary condition can be fulfilled. If this ratio in which density signals are added to other channels at any given moment is made constant, i.e., invariable, then in addition to the desired correction of the distortion of the actual density network along the subtractive density series, a distortion results in other parts of the network.

If the additions are made so large that the points 54, 55 and 56 in Figure 4 coincide respectively with the points 34, 35 and 36 of an ideal network (Figure 3) associated with the actual network, these additions must disappear constantly both towards the white point 57 and also towards the corner points 51, 52 and 53. It is thereby achieved that the corner points 51, 52 and 53 and the white point 57 of the actual density network (Figure 4) also coincide with the corresponding points 31, 32, 33 and 37 of the associated ideal network.

In order to fulfil the aforesaid requirement, the addition must therefore be made dependent on the particular magnitude of the three signals in accordance with a definite law, namely so that it itself rises with increasing magnitude of the signal to be added, while on an increase of the other two signals of which there exists only one at any moment, it becomes smaller and disappears when they reach their maximum value.

These conditions are best explained for example with reference to Figure 4. On the line 57 (white point) 54 (—B), an addition of (—B) into the channel (—R) is necessary, as mentioned above. For (—B)=0 (white point) this addition is equal to 0. It increases with increasing (—B) towards the point 54 and here reaches its maximum. If a move is made from here on the side of the triangle in the direction towards the corner point 53 (red), the addition must become smaller with increasing (—G) signal and disappear on reaching the corner point. The same applies when moving from the point 54 in the opposite direction towards the corner point 52 (green), in this case the decrease takes place with increasing (—R) signal and the addition also becomes 0 when the corner point is reached.

Practice shows that in many cases sufficient correction is obtained when a linear law (which affords special advantages for the realization) is selected for the dependency of the addition on the three components. For the case illustrated in Figure 4, which is characteristic of many cases, the following simple relationships are obtained mathematically for the additions $Z_{(-R_1)}$, $Z_{(-R_2)}$, and $Z_{(-B)}$.

$$Z_{(-R)} = K_1(-B)\left(1 - \frac{(-G)}{(-G_{max})} - \frac{(-R)}{(-R_{max})}\right)$$

$$Z_{(-R_2)} = K_2(-G)\left(1 - \frac{(-B)}{(-B_{max})} - \frac{(-R)}{(-R_{max})}\right)$$

$$Z_{(-B)} = K_3(-R)\left(1 - \frac{(-G)}{(-G_{max})} - \frac{(-B)}{(-B_{max})}\right)$$

Where $(-B_{max})$, $(-G_{max})$ and $(-R_{max})$ mean the maximum color components for the points 54, 55, 56, $K_1$, $K_2$, $K_3$ are proportionality factors. This formal representation gives quite generally a very good insight into the conditions (not only for the case of linear dependency). According the unsymmetrical color distortion, unsymmetrical additions also occur, two additions $Z_{(-R_1)}$ and $Z_{(-R_2)}$ to the red channel and one $Z_{(-B)}$ to the blue channel. An addition to the green channel does not occur at all.

At every point of the triangle, two correction magnitudes occur, the selection being effected automatically in accordance with the instantaneous components. In sector 58 for example (—R) and (—G) 0. There are subsequently obtained the two additions based on the present formulae:

$$Z_{(-R_2)} = K_2(-G)\left(1 - \frac{(-R)}{(-R_{max})}\right)$$

$$Z_{(-B)} = K_3(-R)\left(1 - \frac{(-G)}{(-G_{max})}\right)$$

In consequence of the lack of the (—B) component, the addition of $Z_{(-R_1)}=0$, similarly the quotients with (—B).

Corresponding values are obtained for the other two sectors.

In this way, very extensive coincidence of the actual density network with the ideal network is obtained. This is necessary for error-free color reproduction however, since an ideal subtractive color remainder density network in turn conforms to a density network of an additive color reproducing process, so that together with the exposure color filters to be determined from the latter it guarantees a correct color reproduction.

An arrangement for performing the method according to the invention is illustrated in Figure 5.

The copy, for example, the three-emulsion film 102 obtained on exposure, is scanned by means of a "flying-spot" scanner 101. By way of a color splitter arrangement 103, the scanning light impinges upon three photoelectric cells 104, at whose outputs three color component signals corresponding to the transparencies are obtained. These signals are first amplified in the amplifiers 105. Thereafter, the signals are fed into logarithmic amplifiers 106. Such logarithmic amplifiers are well known in the art and produce an output signal which corresponds to the logarithm of the input signal. By appropriate poling and level regulation, three signals corresponding to the color densities are thus obtained, since as is well known the "density" is defined as the logarithm of the reciprocal of the transparency. These three color density signals are then fed to a selector or black printer circuit 107. In this circuit, the smallest of the three density signals is selected for every image point and forms the "black-printer" signal. Simultaneously, this selected black-printer signal at any moment is subtracted from the other color density signals and the difference gives the so-called "color remainder density signals," while according to definition always at least one of the three color remainder density signals is equal to zero. Details of this method, which do not form the subject of the present invention, are explained in detail in the two patents mentioned above.

The black-white density and color remainder density signals are now passed through the medium of a commutator 108 and a delogarithming and linearizing amplifier 109 to an image tube 110, by which the signals are exposed, according to picture sequence, on a film 111. The recording can be made on separate films for the individual colors or on a common film, the film 111 may be either the film ready for showing or only an intermediate film. The flying spot tube 101 and the image tube 110 are controlled from the same control set 122 so that coincidence of the scanning fields is guaranteed.

For the performance of the invention, addition control devices are now provided between the individual color remainder density channels 112, 113 and 114. Acccording to the representation, the (—B) color remainder signal for example, i.e., the signal carried in channel 114, must, in accordance with the plan mentioned hereinabove, be added in channel (—R) as well in appropriate proportion. The branch with the two regulating amplifiers 115 and 116 serves for this purpose. These serve to vary the magnitude of the addition in dependency upon the various color remainder signals. Thus in the amplifier 115 the color remainder signal (—B) branched off from the channel 114 is so controlled in the dependency on the magnitude of this said (—B) color remainder signal that it rises from zero with increasing magnitude of the appertaining color remainder signal, i.e., of the color remainder signal to be added. In the amplifier 116 on the other hand it is so controlled that it decreases with increasing magnitude of one of the other two color remainder signals, i.e., of the (—R) and/or of the (—G) color remainder signal and becomes zero on the maximum value thereof. This co-directional or contra-directional dependency is indicated symbolically on the two amplifiers.

The two pairs of amplifiers 117—118 and 119—120 now work in corresponding manner. The pair of amplifiers 117—118 serves to control the addition ratio of the (—G) color remainder signal taken from the (—G) channel and of the (—G) color remainder signal added to the (—R) channel, the amplifier 117 controlling the magnitude of the addition in dependence on the (—G) color remainder signal and the amplifier 118 its dependence on the two (—B) and (—R) signals. The pair of amplifiers 119—120 serves to control the variable magnitude of the addition of the (—R) color remainder signal taken from the (—R) channel and added to the (—B) channel. Here the amplifier 119 serves to control the addition in dependence on the (—R) signal and the amplifier 120 serves to control it in dependency on the (—B) and (—G) signals.

What is claimed is:

1. A method of producing a subtractive four-color film of the kind employing a black-printer image and three colored images, comprising the steps of optically scanning a multi-colored original with respect to the red, green and blue color components thereof and thereby deriving a first series of three signals corresponding to the color components of the scanned image points, transforming said series of color component signals into a second series of signals each of which corresponds to the logarithm of the corresponding signal of said first color component series, selecting for each scanned image point the smallest of the three signals of said second series as black-printer signal and forming a third series of signals, each signal of said third series being equal to the corresponding signal of said second series reduced by said black-printer signal and thus forming a series of color residue signals, adding a small percentage of one of said color residue signals to another of said color residue signals, and photographically recording the black-printer signal and the corrected color residue signals thus obtained.

2. The method of producing a subtractive four-color film as defined in claim 1 wherein the percentage of a particular color residue signal which is added to another of said color residue signals is dependent upon the value of that particular color residue signal, said percentage being greatest when said particular color residue signal assumes its maximum value and being zero at zero value of said particular color residue signal.

3. The method of producing a subtractive four-color film as defined in claim 2 wherein the percentage of a particular color residue signal which is added to another of said color residue signals is also dependent upon the value of at least one of the other two color residue signals so that said percentage is greatest when no other color residue signal is present but is zero when another color residue signal assumes its maximum value.

4. A method of producing a subtractive four-color film of the kind employing a black-printer image and three colored images, comprising the steps of optically scanning a multi-colored original with respect to the red, green and blue color components thereof and thereby deriving a first series of three signals corresponding to the color components of the scanned image points, transforming said series of color component signals into a second series of signals each of which corresponds to the logarithm of the corresponding signal of said first color component series, selecting for each scanned image point the smallest of the three signals of said second series as black-printer signal and forming a third series of signals, each signal of said third series being equal to the corresponding signal of said second series reduced by said black-printer signal and thus forming a series of color residue signals, adding a small percentage of each color residue signal to one of the other color residue signals, and photographically recording the black-printer signal and the three corrected color residue signals thus obtained.

5. A method of producing a subtractive four-color film of the kind employing a black-printer image and three colored images, comprising the steps of optically scanning a multi-colored original with respect to the red, green and blue color components thereof and thereby deriving a first series of three signals corresponding to the color components of the scanned image points, transforming said series of color component signals into a second series of signals each of which corresponds to the logarithm of the corresponding signal of said first color component series, selecting for each scanned image point the smallest of the three signals of said second series as black-printer signal and forming a third series of signals, each signal of said third series being equal to the corresponding signal of said second series reduced by said black-printer signal and thus forming a series of color residue signals, adding a small percentage of the blue color residue signal and a small percentage of the green color residue signal to the red color residue signal, and adding a small percentage of the red color residue signal to the blue color residue signal, and photographically recording the black-printer signal and the corrected color residue signals.

References Cited in the file of this patent

UNITED STATES PATENTS

| | | |
|---|---|---|
| 2,231,668 | Hall | Feb. 11, 1941 |
| 2,646,463 | Schroeder | July 21, 1953 |
| 2,684,995 | Schroeder | July 27, 1954 |
| 2,691,696 | Yule | Oct. 12, 1954 |
| 2,710,889 | Tobias | June 14, 1955 |
| 2,748,190 | Yule | May 29, 1956 |

UNITED STATES PATENT OFFICE
CERTIFICATION OF CORRECTION

Patent No. 2,962,544            November 29, 1960

Edgar Gretener

It is hereby certified that error appears in the above numbered patent requiring correction and that the said Letters Patent should read as corrected below.

In the heading to the printed specification, line 7, for "Apr. 16, 1956" read -- Apr. 18, 1956 --.

Signed and sealed this 13th day of June 1961.

(SEAL)
Attest:

ERNEST W. SWIDER
Attesting Officer

DAVID L. LADD
Commissioner of Patents